United States Patent
Li et al.

(10) Patent No.: US 6,683,762 B2
(45) Date of Patent: Jan. 27, 2004

(54) CPP GMR DEVICE WITH INVERSE GMR MATERIAL

(75) Inventors: Min Li, Fremont, CA (US); Simon Liao, Fremont, CA (US); Kochan Ju, Fremont, CA (US)

(73) Assignee: Headway Technologies, Inc., Milpitas, CA (US)

( * ) Notice: Subject to any disclaimer, the term of this patent is extended or adjusted under 35 U.S.C. 154(b) by 70 days.

(21) Appl. No.: 10/167,857

(22) Filed: Jun. 11, 2002

(65) Prior Publication Data

US 2003/0227723 A1 Dec. 11, 2003

(51) Int. Cl.⁷ .................................................. G11B 5/39
(52) U.S. Cl. .................................................. 360/324.11
(58) Field of Search ........................ 360/324.11, 324.1, 360/324.12, 324.2, 324; 338/32 R; 324/207.21, 252; 365/157, 158

(56) References Cited

U.S. PATENT DOCUMENTS

| | | | |
|---|---|---|---|
| 5,627,704 A | 5/1997 | Lederman et al. | 360/113 |
| 5,668,688 A | 9/1997 | Dykes et al. | 360/113 |
| 5,731,937 A | 3/1998 | Yuan | 360/113 |
| 5,856,897 A * | 1/1999 | Mauri | 360/314 |
| 5,959,811 A | 9/1999 | Richardson | 360/113 |
| 6,084,752 A | 7/2000 | Sakakima et al. | 360/113 |
| 6,134,089 A | 10/2000 | Barr et al. | 360/322 |
| 6,338,899 B1 * | 1/2002 | Fukuzawa et al. | 428/332 |

* cited by examiner

Primary Examiner—Craig A. Renner
Assistant Examiner—Angel Castro
(74) Attorney, Agent, or Firm—George O. Saile; Stephen B. Ackerman

(57) ABSTRACT

Pinned layers that are synthetically, rather than directly, pinned are desirable for a Current Perpendicular to Plane Spin Valve structure because they are more stable. However, this comes at the cost or reduced performance. The present invention solves this problem by modifying the composition of AP2. AP2 is the antiparallel layer that contacts the antiferromagnetic layer (AP1 being in contact with the pinned layer). Said modification comprises the addition of chromium or vanadium to AP2. Examples of alloys suitable for use in AP2 include NiFeCr, NiCr, CoCr, CoFeCr, and CoFeV. Additionally, the ruthenium layer normally used to effect antiferromagnetic coupling between AP1 and AP2, is replaced by a layer of chromium. The resulting structure exhibits the stability of the synthetic pin unit and the performance of the direct pin unit.

37 Claims, 1 Drawing Sheet

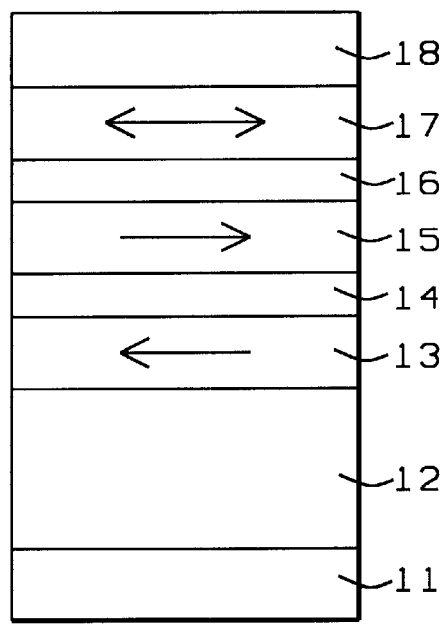
*FIG. 1 - Prior Art*
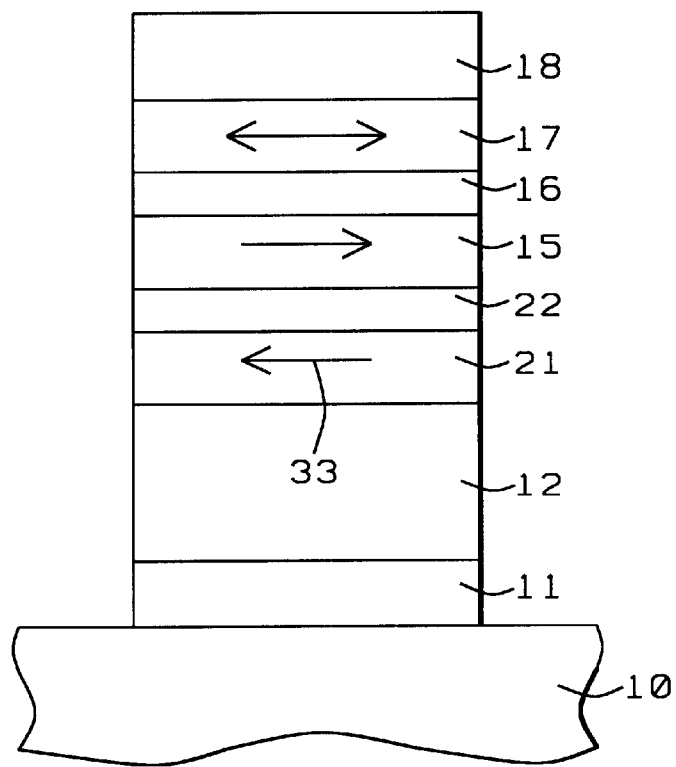
*FIG. 2*

CPP GMR DEVICE WITH INVERSE GMR MATERIAL

FIELD OF THE INVENTION

The invention relates to the general field of magnetic storage devices with particular reference to read heads in disk systems.

BACKGROUND OF THE INVENTION

The principle governing the operation of most current magnetic read heads is the change of resistivity of certain materials in the presence of a magnetic field (magneto-resistance or MR). Magneto-resistance can be significantly increased by means of a structure known as a spin valve or SV. The resulting increase (known as Giant Magneto-Resistance or GMR) derives from the fact that electrons in a magnetized solid are subject to significantly less scattering by the lattice when their own magnetization vectors (due to spin) are parallel (as opposed to anti-parallel) to the direction of magnetization of their environment.

The key elements of a spin valve are a low coercivity (free) ferromagnetic layer, a non-magnetic spacer layer, and a high coercivity ferromagnetic layer. The latter is usually formed out of a soft ferromagnetic layer that is pinned magnetically by a nearby layer of antiferromagnetic material. Additionally, a synthetic antiferromagnet (formed by sandwiching an antiferromagnetic coupling layer between two antiparallel ferromagnetic layers) may be used to replace the ferromagnetic pinned layer. This results in an increase in the size of the pinning field so that a more stable pinned layer is obtained. We will refer to it as a synthetically pinned device.

When the free layer is exposed to an external magnetic field, the direction of its magnetization is free to rotate according to the direction of the external field. After the external field is removed, the magnetization of the free layer will stay at a direction, which is dictated by the minimum energy state, determined by the crystalline and shape anisotropy, current field, coupling field and demagnetization field. If the direction of the pinned field is parallel to the free layer, electrons passing between the free and pinned layers, suffer less scattering. Thus, the resistance at this state is lower. If, however, the magnetization of the pinned layer is anti-parallel to that of the free layer, electrons moving from one layer into the other will suffer more scattering so the resistance of the structure will increase. The change in resistance of a spin valve is typically 8–20%.

Most GMR devices have been designed so as to measure the resistance of the free layer for current flowing parallel to the film's plane. However, as the quest for ever greater densities continues, devices that measure current flowing perpendicular to the plane (CPP) have begun to emerge. For devices depending on in-plane current, the signal strength is diluted by parallel currents flowing through the other layers of the GMR stack, so these layers should have resistivities as high as possible while the resistance of the leads into and out of the device need not be particularly low. By contrast, in a CPP device, the resistivity of both the leads and the other GMR stack layers dominate and should be as low as possible.

As shown in FIG. 1, the CPP spin valve structure has three magnetic layers: free layer 17 as well as AP1 layer 15, and AP2 layer 13. Free layer 17 is free to rotate in response to external fields. The AP2 direction is fixed by antiferromagnetic layer 12 (typically MnPt) with ruthenium layer 14 being used to provide the antiferromagnetic coupling. Their relative magnetization directions of AP1 and AP2 during device operation are always antiparallel to one other. It is normal practice to utilize the same material (like CoFe) for both AP1 and AP2. This has a positive bulk spin asymmetry coefficient $\beta$ as well as positive interface spin asymmetry coefficient $\gamma$.

$\beta$ is defined as $1-\rho\uparrow/(2\rho)=\rho\downarrow/(2\rho)-1$ where $\rho\uparrow, \rho\downarrow$ are the resistivity of spin up and spin down electrons, respectively. $\rho$ is the material resistivity ($=\rho\uparrow\rho\downarrow/\rho\uparrow+\rho\downarrow$). $\gamma$ is defined as $1-r\uparrow/2r_b)=r\downarrow/(r\uparrow+r\downarrow)$ where $r\uparrow(r\downarrow)$ is the interface resistance for spin up and spin down electrons; $r_b=(r\uparrow r\downarrow)/r\uparrow+r\downarrow)$. When $r\uparrow=r\downarrow$, $\gamma$ will be 0 and the interface has no spin dependent scattering. Also seen in FIG. 1 is seed layer 11, capping layer 18 and non-magnetic spacer layer 16.

In TABLE I we show the $\beta$ and $\gamma$ magnitudes for the three magnetic layers together with the resulting magnitude of their resistivity for both up and down electrons for both the parallel and antiparallel states:

TABLE I

| | | | (Ru between AP1 and AP2) | | | |
| --- | --- | --- | --- | --- | --- | --- |
| | | | resistivity in P state | | resistivity in AP state | |
| LAYER | $\beta$ | $\gamma$ | spin up | spin down | spin up | spin down |
| CoFe (free) | >0 | >0 | low | high | high | low |
| CoFe (AP1) | >0 | >0 | low | high | low | high |
| CoFe (AP2) | >0 | >0 | high | low | high | low |

The consequences of this are that the AP2 contribution to CPP GMR is always negative so it reduces the resistance contrast between the parallel and anti-parallel states of the free layer. This limits the GMR ratio as well as dRA (change between parallel and anti-parallel resistance) for synthetically pinned spin valves. This becomes even clearer when we compare a synthetic pin CPP SV with a single CPP SV (i.e. one lacking the AP1 and AP2 layers) by performing a two current channel model calculation. For this example, the calculation assumed the following two structures:

a. seed/MnPt200/CoFe30/Cu20/CoFe30/cap—single CPP SV and b. seed/MnPt200/CoFe20/Ru8/CoFe30/Cu20/CoFe30/cap—Synthetic pin SV The values computed for these two structures were found to be:

a. dRA=1.34 mohm/$\mu$m$^2$; RA=74.9 mohm/$\mu$m$^2$; GMR=1.7% and b. dRA=0.66 mohm/$\mu$m$^2$; RA=78.5 mohm/$\mu$m$^2$; GMR=0.8%

This confirmed that both dRA and GMR were greatly reduced for the synthetically pinned CPP SV due to the AP2's negative contribution. The present invention describes a structure, and process to form it, in which the contribution from AP2 is made to be positive, thereby enhancing both GMR and dRA greatly for a synthetic pin CPP SV.

A routine search of the prior art was performed with the following references of interest being found:

In U.S. Pat. No. 5,627,704, Lederman et al. show a MR CCP transducer structure. Dykes et al. (U.S. Pat. No. 5,668,688) shows a CPP SV MR device. U.S. Pat. No. 6,134,089 (Barr et al.) also describes a CPP MR device. U.S. Pat. No. 5,731,937 (Yuan) teaches a CPP GMR Transducer while Sakakima et al. disclose MTJ (magnetic tunnel junction) and CPP devices in U.S. Pat. No. 6,084,752. In U.S. Pat. No. 5,959,811, Richardson shows a CPP 4 terminal device.

SUMMARY OF THE INVENTION

It has been an object of at least one embodiment of the present invention to provide a Current Perpendicular to Plane Spin Valve (CPP SV) for use as a read head in a magnetic information storage system.

Another object of at least one embodiment of the present invention has been that the pinned layer of said CPP SV be synthetically pinned.

A further object of at least one embodiment of the present invention has been that said CPP SV have a performance that is at least as good as that of one having a directly pinned layer while continuing to enjoy the stability associated with a synthetically pinned layer.

Still another object of at least one embodiment of the present invention has been to provide a process for manufacturing said CPP SV.

These objects have been achieved by modifying the composition of AP2, the antiparallel layer that contacts the antiferromagnetic layer. Said modification comprises the addition of chromium or vanadium to AP2, while still retaining its ferromagnetic properties. Examples of alloys suitable for use in AP2 include FeCr, NiFeCr, NiCr, CoCr, CoFeCr, and CoFeV. The ruthenium layer normally used to effect antiferromagnetic coupling between AP1 and AP2 may be retained or may be replaced by a layer of chromium.

BRIEF DESCRIPTION OF THE DRAWINGS

FIG. 1 is a cross-sectional view of a synthetically pinned CPP SV of the prior art.

FIG. 2 is a cross-sectional view of a synthetically pinned CPP SV as disclosed by the present invention.

DESCRIPTION OF THE PREFERRED EMBODIMENTS

In current synthetic pin CPP SVs, AP2 has the same sign (positive) for both the bulk and interface scattering coefficient ($\beta$ and $\gamma$ respectively) as AP1 and it therefore always reduces the CPP GMR. It has been found that certain magnetic material such as FeCr, NiFeCr, CoFeCr, and CoFeV have negative values of $\beta$, i.e. spin up electrons undergo more scattering than spin down electrons. It has also been found that the material/Cr interface for most magnetic materials also exhibits negative $\gamma$, i.e. spin up electrons undergo more scattering at this interface than spin down electrons). This has been summarized in TABLE II below:

TABLE II

| | | | (Cr or Ru between AP1 and AP2) | | | |
|---|---|---|---|---|---|---|
| | | | resistivity in P state | | resistivity in AP state | |
| LAYER | $\beta$ | $\gamma$ | spin up | spin down | spin up | spin down |
| CoFe (free) | >0 | >0 | low | high | high | low |
| CoFe (AP1) | >0 | >0 | low | high | low | high |
| FeCr (AP2) | <0 | <0 | low | high | low | high |

Thus a FeCr/Cr type bilayer usually has an inverse GMR effect relative to CoFe/Ru type bilayers. We therefore refer to materials of this type as inverse GMR materials. The present invention discloses the use of inverse GMR materials in AP2, which enables CPP GMR, as well as dRA, to be greatly enhanced.

We will disclose the present invention by describing a process for its manufacture. This will also make clear the structure of the present invention:

Referring now to FIG. 2, the process begins with the provision of substrate 10, onto which is deposited seed layer 11 to a thickness between about 10 and 60 Angstroms. Layer 11 is any of Ta, NiCr, Ta/NiCr, NiCrNiFe, for example. This is followed by the deposition, to a thickness of between about 60 and 200 Angstroms, of antiferromagnetic layer 12. Layer 12 is typically MnPt but other materials such as IrMn or NiMn could also have been used. An optional variation of this step is to deposit a layer of the alloy $Co_{90}Fe_{10}$, between about 3 and 5 Angstroms thick, on a MnPt layer prior to the next step.

To form the synthetic pinning layer, layer 21 is deposited onto layer 12 to form AP2. This is any ferromagnetic material, including alloys, that contains at least 5 atomic percent of chromium. Examples include, but are not limited to, FeCr, NiFeCr, NiCr, CoCr, and CoFeCr. In the alternative, layer 21 could comprise any ferromagnetic alloy that contains at least 5 atomic percent of vanadium. Examples include, but are not limited to CoFeV, FeV, and NiFeV. The thickness of layer 21 is between about 10 and 70 Angstroms. Layer 21 is then magnetized in the 180° direction (see arrow 33) by exposing it to a magnetic field of between about 6,000 and 12,000 Oe for between about 3 and 10 hours at a temperature of between about 250 and 300° C.

Chromium (or ruthenium) layer 22 is now deposited onto layer 21 to a thickness between about 5 and 15 Angstroms (for chromium). The use of chromium represents a definite departure from the prior art where 6–9 Angstroms of ruthenium would have been used for this layer.

Then layer 15 (AP1) is deposited on chromium (or ruthenium) layer 22, between about 20 and 50 Angstroms being typical. This allows it to be magnetized in a direction that is antiparallel AP2 (layer 21) without affecting the magnetization of AP2. Layer 15 is usually cobalt-iron.

Formation of the stack is completed by depositing non-magnetic spacer layer 16 (typically copper between about 10 and 35 Angstroms thick) on layer 15 followed by the successive depositions of free layer 17 (usually CoFe between about 20 and 60 Angstroms thick) and capping layer 18. The latter is deposited to a thickness between about 10 and 200 Angstroms and is Cu or Cu/Ta.

RESULTS

Using a two current channel model, the expected performance of the device just described above was computed and compared with that of a synthetically pinned structure of the prior art:

Prior art structure: Seed/MnPt200/CoFe20/Ru8/CoFe30/Cu20/CoFe30/cap

Invented structure: Seed/MnPt200/FeCr50/Cr10/CoFe30/Cu20/Cofe30/cap

The Results Were:

Prior art structure: dRA=0.66 mohm/$\mu m^2$; RA=78.5 mohm/$\mu m^2$; GMR=0.8%

Invented structure: dRA=1.45 mohm/$\mu m^2$; RA=81.5 mohm/$\mu m^2$; GMR=1.8%

This data confirms that about 120% dRA and GMR improvement are obtained so the performance of the structure of the present invention is comparable to that of a single SV (no synthetic pinning) but without having to give up the advantages of synthetic pinning, as discussed earlier.

What is claimed is:

1. A magnetic read head comprising:

a layer of antiferromagnetic material on a seed layer;

on said layer of antiferromagnetic material, a first layer, of any ferromagnetic material including alloys, that contains at least 5 atomic percent of chromium, said first layer being magnetized in a first direction;

a layer of chromium on said first layer;

on said layer of chromium, a second layer, of cobalt-iron, said second layer being magnetized in a second direction that is anti-parallel to said first direction;

on said second layer, a copper spacer layer on which is a free layer of cobalt-iron; and a cap layer on said free layer.

2. The magnetic read head described in claim 1 wherein said seed layer has a thickness between about 10 and 60 Angstroms and is selected from the group consisting of Ta, NiCr, Ta/NiFe, NiCr/NiFe.

3. The magnetic read head described in claim 1 wherein said cap layer has a thickness between about 10 and 200 Angstroms and is selected from the group consisting of Cu and Cu/Ta.

4. The magnetic read head described in claim 1 wherein said layer of antiferromagnetic material has a thickness between about 30 and 200 Angstroms and is selected from the group consisting of MnPt, NiMn, and IrMn.

5. The magnetic read head described in claim 1 wherein said first layer, of any ferromagnetic material including alloys, has a thickness between about 10 and 70 Angstroms.

6. The magnetic read head described in claim 1 wherein said chromium layer has a thickness between about 5 and 15 Angstroms.

7. The magnetic read head described in claim 1 wherein said second layer, of cobalt-iron, has a thickness between about 20 and 50 Angstroms.

8. The magnetic read head described in claim 1 wherein said free layer has a thickness between about 20 and 60 Angstroms.

9. The magnetic read head described in claim 1 wherein said layer of antiferromagnetic material is MnPt, having a thickness between about 80 and 200 Angstroms and there is a layer of $Co_{90}Fe_{10}$, between about 3 and 5 Angstroms thick, between said MnPt layer and said first layer of any ferromagnetic material.

10. The magnetic read head described in claim 1 wherein said first layer, of any ferromagnetic material, is selected from the group consisting of NiFeCr, NiCr, CoCr, and CoFeCr.

11. The magnetic read head described in claim 1 wherein said read head is a CPP spin valve.

12. The magnetic read head described in claim 11 wherein said CPP spin valve has a GMR ratio of at least 18%.

13. A synthetically pinned CPP SV magnetic read head comprising:

a layer of antiferromagnetic material on a seed layer;

on said layer of antiferromagnetic material, a first layer, of any ferromagnetic material including alloys, that contains at least 5 atomic percent of vanadium, said first layer being magnetized in a first direction;

a layer of chromium on said first layer;

on said layer of chromium, a second layer, of cobalt-iron, said second layer being magnetized in a second direction that is anti-parallel to said first direction;

on said second layer, a copper spacer layer on which is a free layer of cobalt-iron; and a cap layer on said free layer.

14. The magnetic read head described in claim 13 wherein said layer of antiferromagnetic material has a thickness between about 30 and 200 Angstroms and is selected from the group consisting of MnPt, NiMn, and IrMn.

15. The magnetic read head described in claim 13 wherein said first layer, of any ferromagnetic material including alloys, has a thickness between about 10 and 70 Angstroms.

16. The magnetic read head described in claim 13 wherein said chromium layer has a thickness between about 5 and 15 Angstroms.

17. The magnetic read head described in claim 13 wherein said second layer, of cobalt-iron, has a thickness between about 20 and 50 Angstroms.

18. The magnetic read head described in claim 13 wherein said free layer has a thickness between about 20 and 60 Angstroms.

19. The magnetic read head described in claim 13 wherein said first layer, of any ferromagnetic material, is selected from the group consisting of CoFeV, NiFeV, and FeV.

20. The magnetic read head described in claim 13 wherein said read head is a CPP spin valve.

21. The magnetic read head described in claim 20 wherein said CPP spin valve has a GMR ratio of at least 1.5%.

22. A process to manufacture a synthetically pinned CPP SV magnetic read head, comprising:

providing a substrate and depositing thereon a seed layer;

depositing a layer of antiferromagnetic material on said seed layer;

to a first thickness, depositing on said layer of antiferromagnetic material, a first layer, of any ferromagnetic material including alloys, that contains at least 5 atomic percent of chromium;

then magnetizing said first layer in a first direction;

depositing a layer of chromium on said first layer;

to a second thickness, that is less than said first thickness, depositing, on said layer of chromium, a second layer, of cobalt-iron;

on said second layer, depositing a non-magnetic spacer layer and then depositing a free layer of cobalt-iron on said spacer layer; and then depositing a cap layer on said free layer.

23. The process described in claim 22 wherein said seed layer is deposited to a thickness between about 10 and 60 Angstroms and is selected from the group consisting of Ta, NiCr, Ta/NiFe, NiCr/NiFe.

24. The process described in claim 22 wherein said cap layer is deposited to a thickness between about 10 and 200 Angstroms and is selected from the group consisting of Cu and Cu/Ta.

25. The process described in claim 22 wherein said layer of antiferromagnetic material is deposited to a thickness between about 30 and 200 Angstroms and is selected from the group consisting of MnPt, NiMn, and IrMn.

26. The process described in claim 22 wherein said first layer, of any ferromagnetic material including alloys, is deposited to a thickness between about 10 and 70 Angstroms.

27. The process described in claim 22 wherein said chromium layer is deposited to a thickness between about 5 and 15 Angstroms.

28. The process described in claim 22 wherein said second layer, of cobalt-iron, is deposited to a thickness between about 20 and 50 Angstroms.

29. The process described in claim 22 wherein said free layer is deposited to a thickness between about 20 and 60 Angstroms.

30. The process described in claim 22 wherein said layer of antiferromagnetic material is MnPt, having a thickness between about 60 and 200 Angstroms and further comprising depositing a layer of $Co_{90}Fe_{10}$, between about 3 and 5

Angstroms thick, on said MnPt layer and then depositing thereon said first layer of any ferromagnetic material.

31. The process described in claim 22 wherein said first layer, of any ferromagnetic material, is selected from the group consisting of NiFeCr, NiCr, CoCr, and CoFeCr.

32. A process to manufacture a synthetically pinned CPP SV magnetic read head, comprising:

providing a substrate and depositing thereon a seed layer;

depositing a layer of antiferromagnetic material on said seed layer;

to a first thickness, depositing on said layer of antiferromagnetic material, a first layer, of any ferromagnetic material including alloys, that contains at least 5 atomic percent of vanadium;

then magnetizing said first layer in a first direction;

depositing a layer of chromium on said first layer;

to a second thickness, that is less than said first thickness, depositing, on said layer of chromium, a second layer, of cobalt-iron;

on said second layer, depositing a non-magnetic spacer layer and then depositing a free layer of cobalt-iron on said spacer layer; and then depositing a cap layer on said free layer.

33. The process described in claim 32 wherein said first layer, of any ferromagnetic material including alloys, is deposited to a thickness between about 10 and 70 Angstroms.

34. The process described in claim 32 wherein said chromium layer is deposited to a thickness between about 5 and 15 Angstroms.

35. The process described in claim 32 wherein said second layer, of cobalt-iron, is deposited to a thickness between about 20 and 50 Angstroms.

36. The process described in claim 32 wherein said free layer is deposited to a thickness between about 20 and 60 Angstroms.

37. The process described in claim 32 wherein said first layer, of any ferromagnetic material, is selected from the group consisting of CoFeV, NiFeV, and FeV.

* * * * *

UNITED STATES PATENT AND TRADEMARK OFFICE
CERTIFICATE OF CORRECTION

PATENT NO.    : 6,683,762 B2
DATED         : January 27, 2004
INVENTOR(S)   : Min Li, Simon Liao and Kochan Ju It is certified that error appears in the above-identified patent and that said Letters Patent is hereby corrected as shown below:

Column 4,
Line 4, delete "Ta/NiCr" and replace it with -- Ta/NiFe --.

Signed and Sealed this

Twenty-eighth Day of September, 2004

JON W. DUDAS
*Director of the United States Patent and Trademark Office*